(No Model.)

W. HASLUP.
WHEEL.

No. 442,043. Patented Dec. 2, 1890.

Witnesses
C. W. Miles
Geo. Ashton

Inventor
William Haslup
By his Attorneys Wood & Boyd

UNITED STATES PATENT OFFICE.

WILLIAM HASLUP, OF SIDNEY, ASSIGNOR OF ONE-HALF TO J. H. DOERING, OF WAPAKONETA, OHIO.

WHEEL.

SPECIFICATION forming part of Letters Patent No. 442,043, dated December 2, 1890.

Application filed September 1, 1890. Serial No. 363,692. (No model.)

*To all whom it may concern:*

Be it known that I, WILLIAM HASLUP, a citizen of the United States, and a resident of Sidney, in the county of Shelby and State of Ohio, have invented certain new and useful Improvements in Wheels, of which the following is a specification.

This invention has for its object to provide a novel, simple, and economical metallic wheel which is strained as the parts are secured together; and to such end the invention consists in the features of construction and the combination or arrangement of devices hereinafter described and claimed, reference being made to the accompanying drawings, in which—

Figure 1:
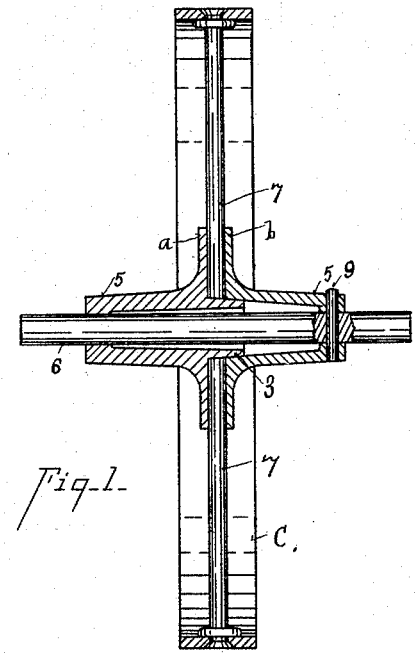
Figure 2:
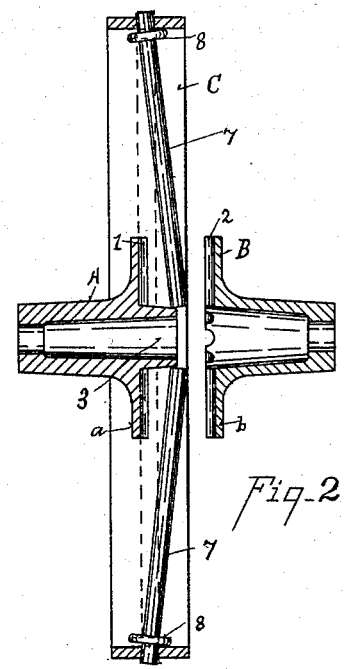
Figure 3:
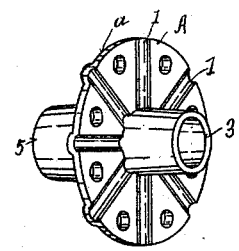
Figure 4:
Figure 5:
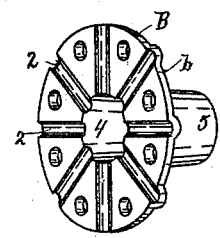

Figure 1 is a longitudinal central vertical section of my improvement. Fig. 2 is a diagram showing the wheel in condition to be put together. Fig. 3 is a perspective view of one of the hub-sections. Fig. 5 is a perspective view of the other hub-section. Fig. 4 is an elevation of the spoke.

The hub of my wheel is formed of duplex sections A B, which are preferably made of malleable or steel castings having spoke-grooves 1 and 2. Section A is provided with the hub or boss 3, which fits and rests in corresponding socket 4 of section B.

5 represents the ends of the hub, which are bored out to receive the axle 6.

7 represents the spokes provided with sustaining-head 8, which is formed by upsetting the metal.

The parts are put together as follows: The spokes are inserted in the rim C with the inner ends resting on hub-sections A as shown in Fig. 2. The section B is then pressed up against section A, forcing the spokes inward up the incline of the boss 3, on which the spokes rest, thereby straining the wheel. Disks *a b* are then riveted together, the spokes nesting in the groove in the disks. The ends of the spokes 7 are then riveted on the outside of the rim, thereby firmly uniting all parts of the wheel together in a strained condition. The axle 6 is shown as made of one of the spokes, the head 8 being made a sufficient distance so as to allow gudgeons, when the same is desired to be used as an axle for a wheelbarrow. When it is desired to have the axle stationary, a pin 9 is bored through the hub and through the axle 6. The inner ends of the series of spokes resting upon the boss 3 being firmly riveted to the rim, form a very strong and durable arch. The spokes resting on the hub serve as an abutment for the arch, and as the tapering hub or boss 3 extends into and bears against the wall of the tapering bore in the section B a strong abutment for the spokes is provided, while the provision of the collars 8 and spoke-tenons, adapted to orifices in the wheel-rim, enable the wheel to be strained by moving the spokes on the tapering hub or boss 3, thereby providing a very desirable and economical metallic wheel.

Having described my invention, what I claim is—

1. A metallic wheel consisting of the two hub-sections A B, formed with counterpart and coincident grooves 1 and 2, each section having the hub-extension 5 and one section provided with the tapering boss 3, fitting within the bore of the opposite hub-extension, and the spokes 7, fitting the respective grooves in the hub-sections, engaged with orifices in the wheel-rim, and bearing on the tapering boss by which the wheel is strained, substantially as described.

2. A metallic wheel consisting of the rim having orifices, the hub-sections A B, formed with counterpart and coincident grooves 1 and 2, each section having the hub-extension 5 and one section having the tapering boss 3, fitting the opposite hub-extension, and the spokes 7, fitting orifices in the wheel-rim, provided with collars 8, bearing against the inside of the rim and having their inner ends arranged in the counterpart and coincident grooves of the hub-sections and resting against the tapering boss by which the wheel is strained, substantially as described.

In testimony whereof I have hereunto set my hand.

WILLIAM HASLUP.

Witnesses:
GEORGE B. STERLINE,
J. M. LEIDIGH.